US010322663B1

(12) United States Patent
Goyal et al.

(10) Patent No.: US 10,322,663 B1
(45) Date of Patent: Jun. 18, 2019

(54) STORAGE LOCATIONS WITH INFLATABLE BLADDERS

(71) Applicant: Amazon Technologies, Inc., Seattle, WA (US)

(72) Inventors: Dushyant Goyal, Redmond, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 409 days.

(21) Appl. No.: 15/188,918

(22) Filed: Jun. 21, 2016

(51) Int. Cl.
*B60P 7/06* (2006.01)
*B65G 1/12* (2006.01)
*G06Q 10/08* (2012.01)
*B65G 1/02* (2006.01)

(52) U.S. Cl.
CPC ............. *B60P 7/065* (2013.01); *B65G 1/02* (2013.01); *B65G 1/12* (2013.01); *G06Q 10/087* (2013.01); *Y10S 901/01* (2013.01)

(58) Field of Classification Search
CPC ......... B60P 7/065; B65D 81/052; B65G 1/12; B65G 1/02; G06Q 10/087; B61D 45/008
See application file for complete search history.

(56) References Cited

U.S. PATENT DOCUMENTS

| 3,131,648 A * | 5/1964 | Seger ...................... B60P 7/065 |
| | | 206/522 |
| 7,677,267 B2 * | 3/2010 | Warnick ................ F15B 11/028 |
| | | 137/492.5 |
| 8,280,547 B2 | 10/2012 | D'Andrea et al. |
| 8,281,928 B2 | 10/2012 | Smith |
| 9,087,314 B2 | 7/2015 | Hoffman et al. |
| 2010/0089911 A1 * | 4/2010 | Haddad .............. B65D 90/0066 |
| | | 220/1.5 |
| 2012/0315105 A1 * | 12/2012 | Freeman ................. B60P 7/065 |
| | | 410/119 |

FOREIGN PATENT DOCUMENTS

GB          1390518 A  *  4/1975  ............. B60P 7/065

* cited by examiner

*Primary Examiner* — Timothy L Maust
*Assistant Examiner* — Timothy P. Kelly
(74) *Attorney, Agent, or Firm* — Kilpatrick Townsend & Stockton LLP

(57) ABSTRACT

Systems may include a storage location and a bladder. The storage location may have a volume. The bladder may be selectively inflatable and deflatable to change an amount of the volume of the storage location that is occupied by the bladder. Fluid communication between the bladder and an inflation network may change an amount of pressurized fluid present in the bladder so as to change the amount of the volume of the storage location occupied by the bladder. For example, this may cause the bladder to press against an item in the storage location, such as to secure the item or to facilitate a determination of an amount of space that is occupied in the storage location and/or an amount of space that is available for receipt of additional items.

12 Claims, 18 Drawing Sheets

STORAGE LOCATIONS WITH INFLATABLE BLADDERS

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance.

In many scenarios, increased or improved levels of automation may improve operation of inventory systems. For example, many warehouses exist with shelving units or other inventory holders that can be moved from place to place within the warehouse by unmanned, robotic, mobile drive units. Although such arrangements may provide many advantages, they may give rise to other challenges. For example, in some situations, movement of inventory holders may result in movement of inventory items carried by the inventory holders. Such movement may result in inventory items being damaged or misplaced, such as from items colliding within the inventory holders and/or items falling out of the inventory holder during movement by the mobile drive unit.

Additionally, in many cases, operators tasked with stowing or loading inventory items into inventory holders may fail to recognize pockets of available space in an inventory holder. For example, items may be arranged in the inventory holder such that available space is blocked from the operator's view, and/or an operator may fail to recognize that an item is sufficiently compressible to allow other items to be stowed in the same space. Failure to recognize available space may cause an operator to transition to other inventory holders that have more easily identifiable space available instead of effectively utilizing the capacity of each inventory holder.

Thus, in many situations, reducing failures to recognize available space and/or reducing damage to inventory items that may occur when moving inventory holders can be beneficial ways to improve efficiency, increase reliability, and/or lower costs of inventory system operations.

BRIEF DESCRIPTION OF THE DRAWINGS

Various embodiments in accordance with the present disclosure will be described with reference to the drawings, in which.

DETAILED DESCRIPTION

Figure 1:
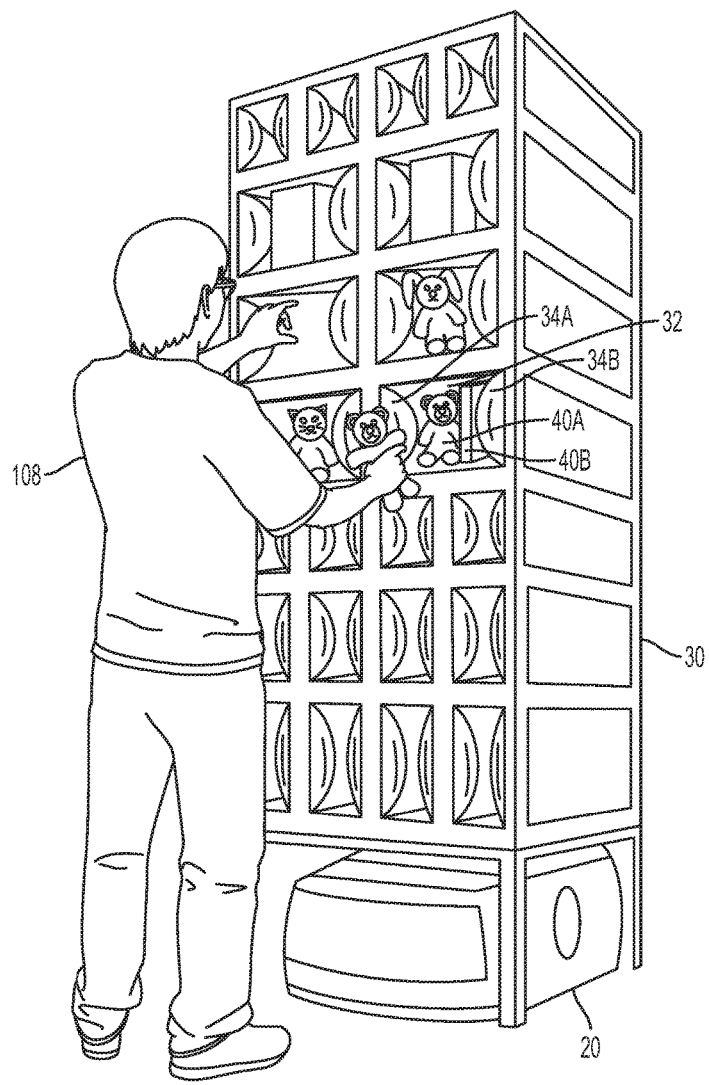
FIG. 1 illustrates an inventory holder with inflatable bladders according to certain embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Specifically, features herein are directed to bladders that can be provided in inventory holders. The bladders can inflate or deflate to change an amount of space occupied by the bladders within a given bin or other storage location of an inventory holder. For example, the bladders may expand around items in a storage location of an inventory holder to squeeze and grip the items and so prevent detrimental movement of the items when the inventory holder is being moved by the mobile drive unit.

In some embodiments, the bladders can be maintained in an inflated state to prevent access to a storage location for removing or adding items relative to the storage location. Conversely, the bladders may deflate to permit access. Using the bladders for controlling selective access to the storage locations may reduce a risk that an operator will access an incorrect bin during picking or stowing tasks.

In some embodiments, a bladder inflation level may be adjusted to provide a visual identification or other cue relative to a storage location. For example, a bladder inflation level may be modulated so that the bladder moves back and forth as an eye-catching motion to cue an operator as to which bin is designated for the operator's next task of adding or removing an item.

In some embodiments, the bladders can cause movement of items relative to storage locations. In one example, inflating or deflating bladders may move items away from an open face of a bin, e.g., away from a position at which the item may be subject to a higher risk of falling out of the inventory holder during movement by a mobile drive unit. In another example, the bladders may be used to move items so as to change the locations of the respective weights of the items and improve an overall weight distribution for an inventory holder.

In some embodiments, the amount of inflation of a bladder or set of bladders can be determined in order to gauge space utilization in a storage location. For example, the amount of space that is occupied in a bin by inventory items in some cases may be determined based on an amount that a bladder is inflated.

The bladders may be coupled with a suitable inflation network that causes or permits inflation or deflation of the bladder. The inflation network can include a pump or any other suitable source of pressure for controlling inflation of the bladder. The inflation network can additionally or alternatively include any other valves, hoses, controllers, or associated connections to facilitate control of the inflation network and inflation of the bladders.

In some embodiments, the inflation network may include components that are remote from a respective storage location. For example, a pump in a base of an inventory holder may be utilized to provide inflation to a storage location near a top of the inventory holder. In some embodiments, the inflation network may include components that couple with one another. For example, such coupling may permit pressurized air or other fluid from a mobile drive unit to be routed through an inventory holder to a particular bladder. Additionally or alternatively, a separate structure may be included at a station or other place in the facility to provide power, control, and/or pressure connections or sources for an inventory holder with bladders.

Referring now to the drawings, in which features identified by like name and numerals may refer the same or similar features in different drawings, FIG. 1 illustrates an inventory holder 30. The inventory holder 30 may be moved by a mobile drive unit 20, such as to move the inventory holder 30 to a position where an operator 108 may perform tasks relative to the inventory holder 30. The inventory holder 30 illustrated in FIG. 1 includes bladders 34 (e.g., those individually identified as bladders 34A and 34B). The bladders 34A and 34B are positioned so that inflation will increase an amount of space or volume they occupy in a respective storage location 32. The storage location 32 is shown storing inventory items 40 (e.g., the stuffed bear 40A and the box 40B). The inventory items 40 may correspond to objects that the operator 108 has stowed in the storage location 32 and/or to objects that the operator 108 will be tasked with picking or removing from the inventory holder 30, such as to facilitate processes for fulfilling orders for the items 40.

Figure 2:
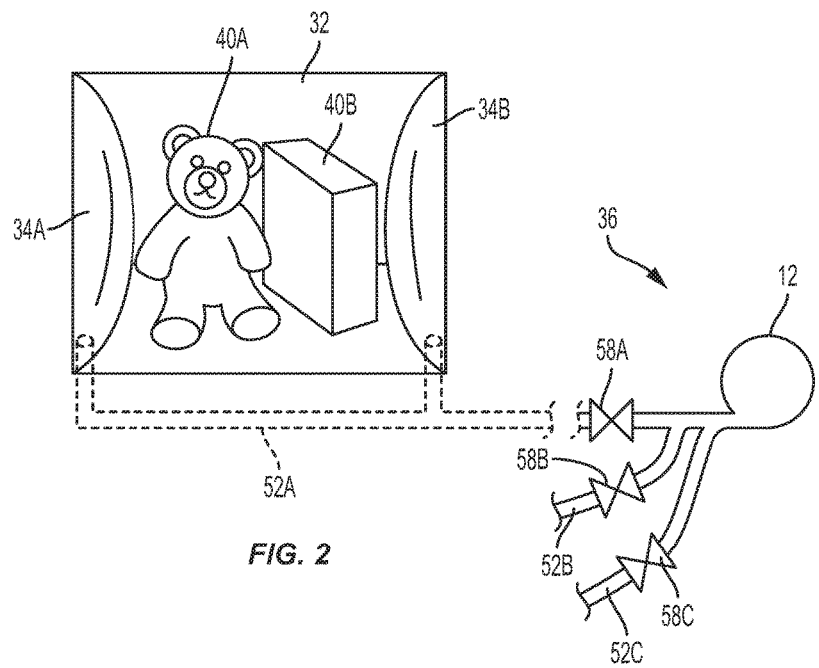
FIG. 2 illustrates a storage location of the inventory holder of FIG. 1 and associated bladders.

FIG. 2 illustrates the storage location 32 in greater detail. The bladders 34A and 34B are shown coupled with an inflation network 36. The inflation network 36 shown in FIG. 2 includes a pump or other pressure source 12, pressure conduits 52 (individually identified as 52A, 52B, and 52C), and valves 58 (individually identified as 58A, 58B, and 58C). The pressure source 12 is shown as a pump, but may include any suitable compressor or other mechanism for conveying air or other fluid through the pressure conduits 52 and/or into the bladders 34.

The inflation network 36 can be controlled to change the inflation level of the bladders 34A and 34B. For example, an operating level of the pressure source 12 may be controlled to provide a suitable amount of pressurized fluid for inflation of the bladders 34. The valves 58 may be operated to direct the pressurized fluid from the pressure source 12. For example, the valve 58A may be opened or maintained in an open state to permit pressurized fluid to reach the storage location 32, while the other valves 58B and 58C at the same time may be closed or opened to respectively prevent or permit inflation elsewhere. Receipt of pressurized fluid through the inflation network 36 can cause the bladders 34A and 34B to inflate, such as from the position shown in FIG. 2 to the position shown in FIG. 3.

Figure 3:
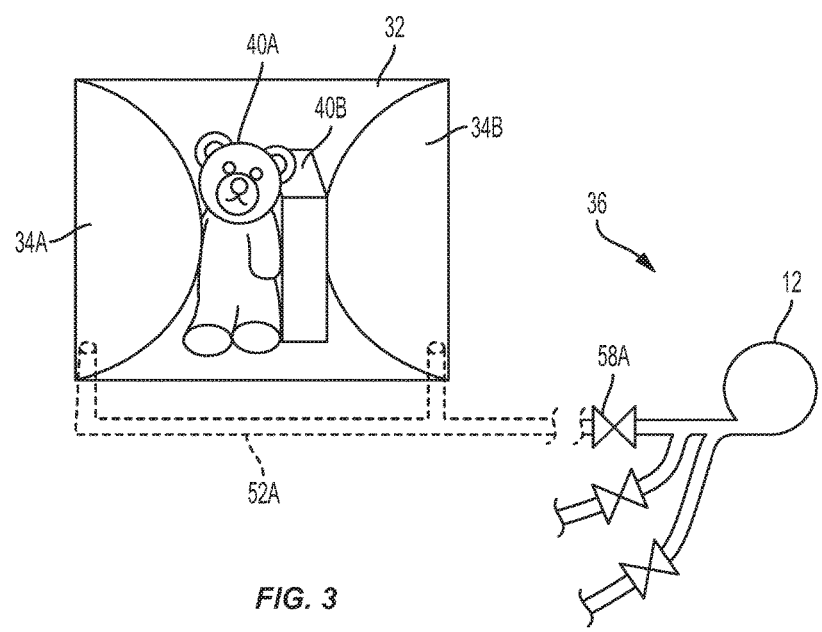
FIG. 3 illustrates the storage location of FIG. 2 with the bladders more inflated than in FIG. 2.

FIG. 3 illustrates the bladders 34 inflated about the inventory items 40 in the storage location 32. In this illustrated example, the inflation of the bladders 34 has caused movement of the box 40B closer to the bear 40A. Additionally, the bear 40A has been compressed against the box 40B. In this state, the bear 40A and box 40B are secured in place relative to the storage location 32 by the bladders 34A and 34B. The secured state of the items 40 may reduce a chance that the items 40 may move when the inventory holder 30 is moved by the mobile drive unit 20, thus reducing a chance that the items may fall out of the storage location 32 or collide with each other or boundaries of the storage location 32 in a way that may cause damage to the items 40.

Additionally, the secured state of the items 40 may prevent an operator 108 from removing either of the items 40 without the bladders 34 first being deflated. This effect may be used to reduce a chance that the operator 108 may mistakenly access the storage location 32 when it is not the target of the operator's task. For example, the bladders 34 may be controlled to only deflate and permit access by the operator 108 when the storage location 32 is a target or permissible option for the operator's task.

Inflating the bladders 34 to move the box 40B toward the bear 40A and to compress the bear 40A may also allow an operator 108 to more easily appreciate an amount of space that the items 40 occupy in the storage location 32. This may permit the operator 108 to more readily recognize that additional items can be fit into the storage location 32 and more effectively use available space on the inventory holder 30.

Embodiments herein are not limited to the arrangement shown in FIGS. 1-3. Other options and features related to bladders 34 are possible, such as examples described below with reference to FIGS. 15-31. In various embodiments, disclosed options and features may be particularly useful when implemented in the context of an inventory system, such as the inventory system 10 that will now be described in additional detail.

Figure 4:
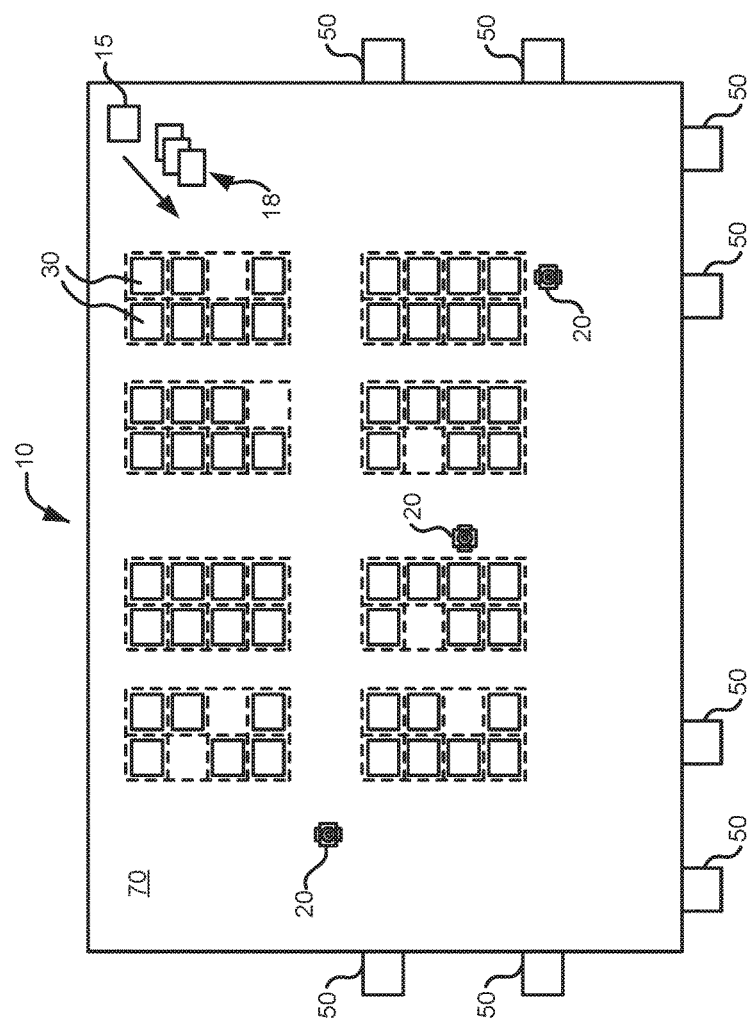
FIG. 4 illustrates components of an inventory system according to certain embodiments.

FIG. 4 illustrates components of an inventory system 10 in which the inventory holder 30 with bladders 34 may be used. The inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 4 as a single, discrete component, management module 15 may represent multiple components and may represent or include portions of mobile drive units 20 or other elements of inventory system 10. As a result, any or all of the interactions between a particular mobile drive unit 20 and management module 15 that are described below may, in particular embodiments, represent peer-to-peer communication between that mobile drive unit 20 and one or more other mobile drive units 20. The components and operation of an example embodiment of management module 15 are discussed further below with respect to FIG. 5.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The components and operation of an example embodiment of a mobile drive unit 20 are discussed further below with respect to FIGS. 6 and 7.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 4 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 4 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 5:
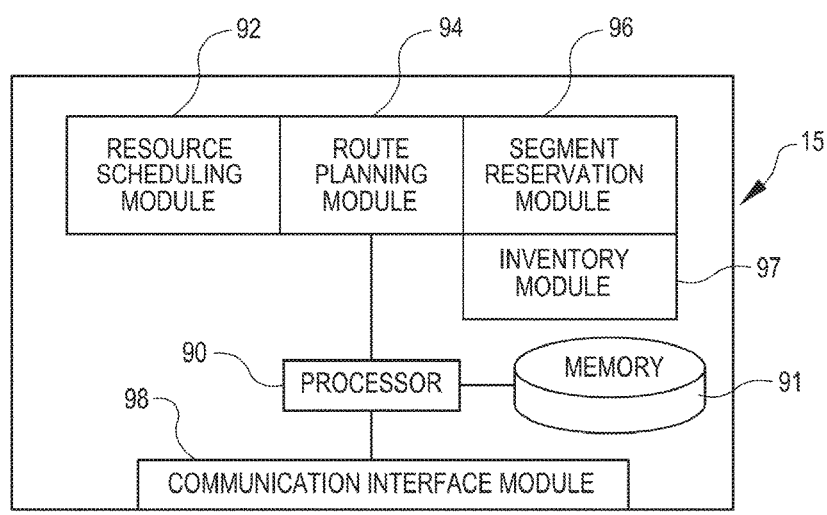
FIG. 5 illustrates in greater detail the components of an example management module that may be utilized in certain embodiments of the inventory system shown in FIG. 4.

FIG. 5 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 6:
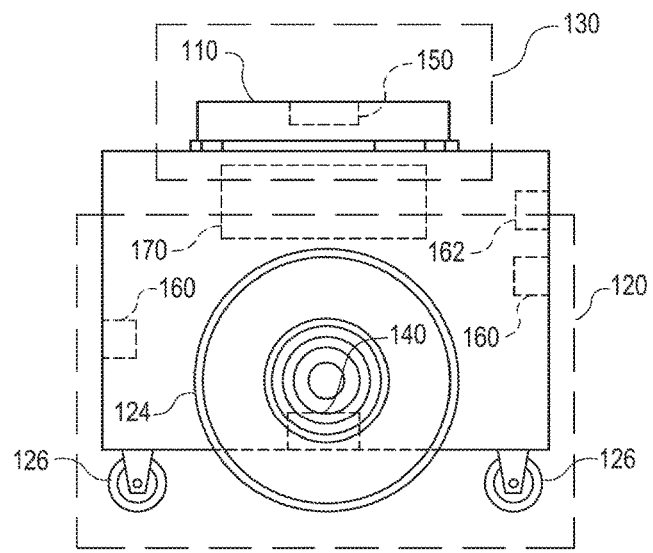
FIGS. 6 and 7 illustrate in greater detail an example mobile drive unit that may be utilized in certain embodiments of the inventory system shown in FIG. 4.
Figure 7:
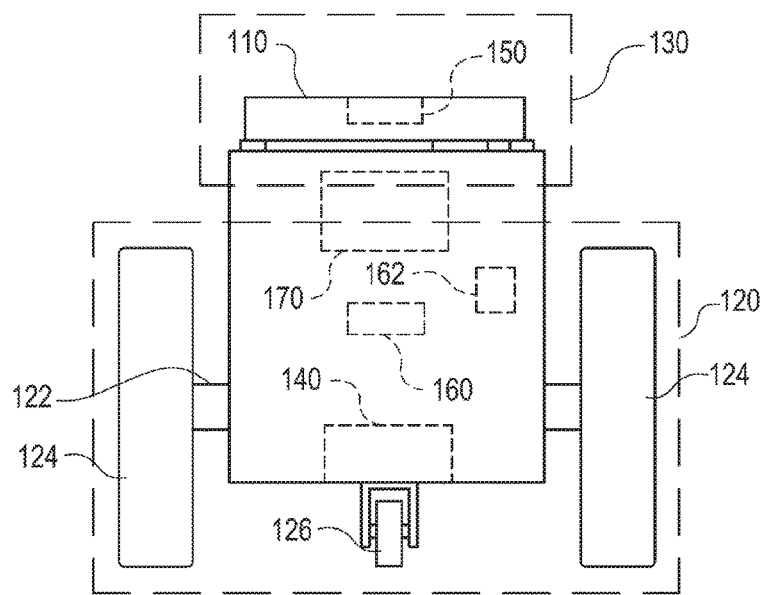

FIGS. 6 and 7 illustrate in greater detail the components of a particular embodiment of mobile drive unit 20. In particular, FIGS. 6 and 7 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 6 and 7 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 8:
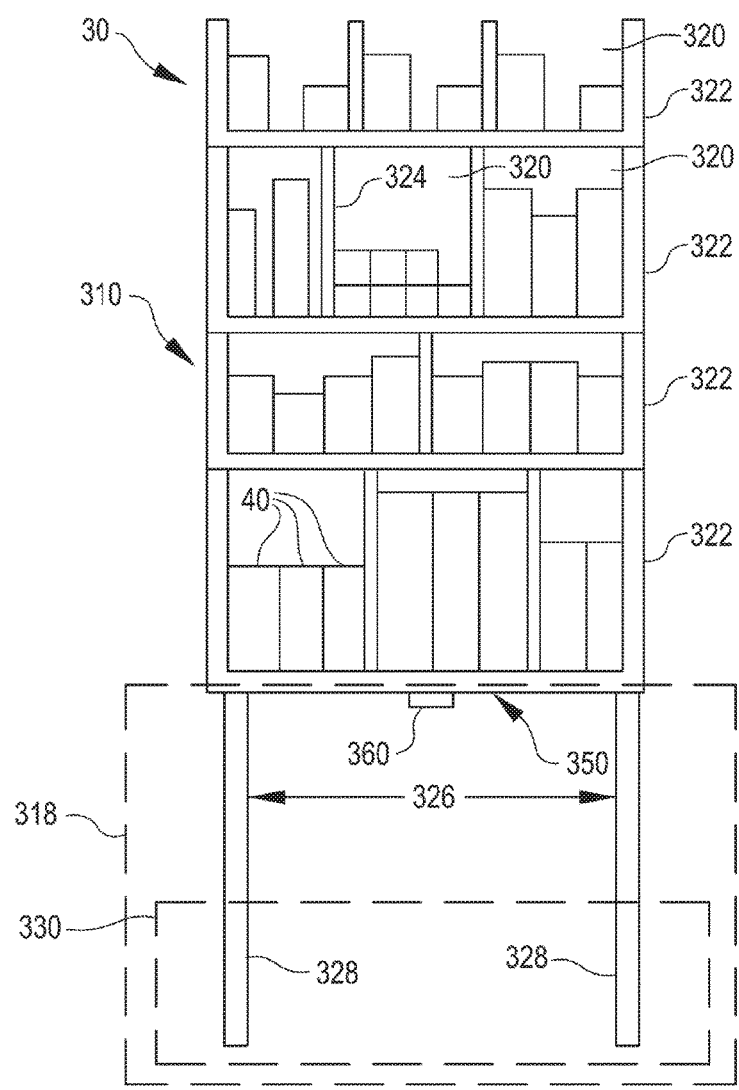
FIG. 8 illustrates in greater detail an example inventory holder that may be utilized in certain embodiments of the inventory system shown in FIG. 4.

FIG. 8 illustrates in greater detail the components of a particular embodiment of inventory holder 30. In particular, FIG. 8 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

FIGS. 9-14 illustrate operation of particular embodiments of mobile drive unit 20 and inventory holder 30 during docking, movement, and undocking.

Figure 9:
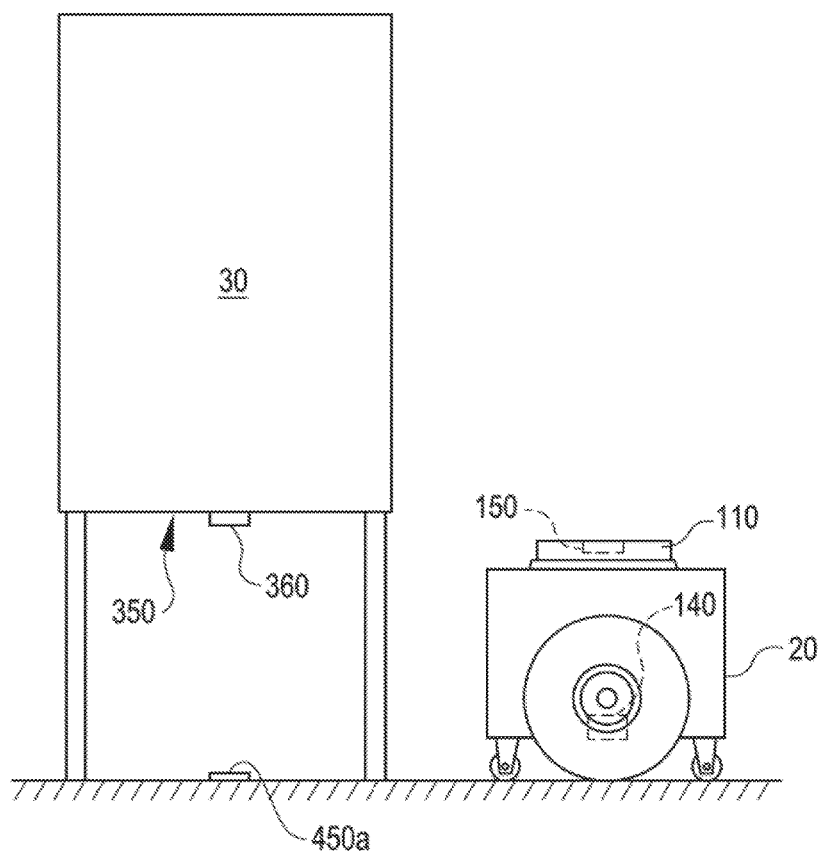
FIGS. 9-14 show operation of various components of the mobile drive unit and the inventory holder during docking, movement and undocking.

FIG. 9 illustrates mobile drive unit 20 and inventory holder 30 prior to docking. As noted above with respect to FIG. 4, mobile drive unit 20 may receive a command that identifies a location for a particular inventory holder 30. Mobile drive unit 20 may then move to the location specified in the command. Additionally, mobile drive unit 20 may utilize position sensor 140 to determine the location of mobile drive unit 20 to assist in navigating to the location of inventory holder 30.

In particular, FIG. 9 shows mobile drive unit 20 and inventory holder 30 as mobile drive unit 20 approaches the storage location identified by the received command. In the illustrated embodiment, the reference point is marked by fiducial mark 450A which comprises a surface operable to reflect light and which, as a result, can be detected by particular embodiments of position sensor 140 when mobile drive unit 20 is positioned over or approximately over fiducial mark 450A. As noted above, the illustrated embodiment of mobile drive unit 20 utilizes optical sensors, including a camera and appropriate image- and/or video processing components, to detect fiducial marks 450.

Figure 10:
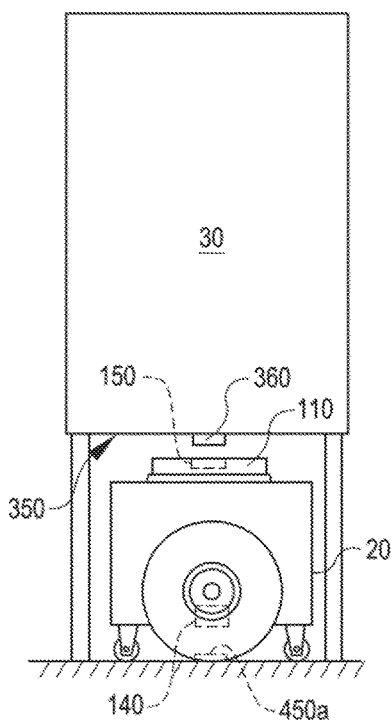

FIG. 10 illustrates mobile drive unit 20 and inventory holder 30 once mobile drive unit 20 reaches fiducial mark 450A. Because, in the illustrated example, fiducial mark 450A marks the location of the reference point to which mobile drive unit 20 is destined, mobile drive unit 20 begins the docking process once mobile drive unit 20 reaches fiducial mark 450A. In the illustrated example, mobile drive unit 20 is configured to dock with inventory holder 30 from a position beneath inventory holder 30 and, as a result, inventory holder 30 is stored so that docking surface 350 is located directly above fiducial mark 450A.

Figure 11:
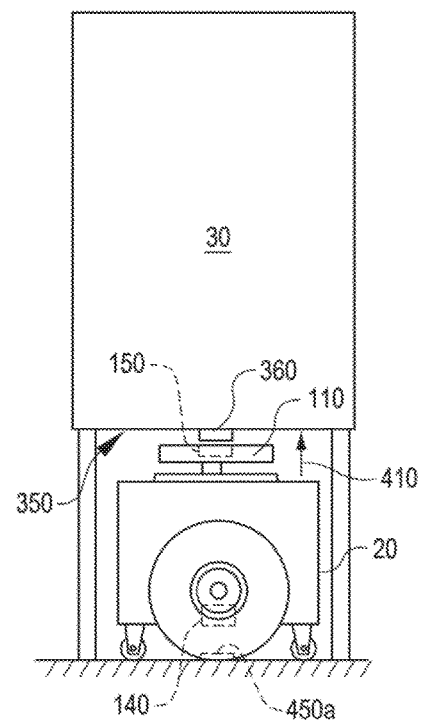

FIG. 11 illustrates operation of mobile drive unit 20 in docking with inventory holder 30. After positioning itself over fiducial mark 450A, mobile drive unit 20 begins the docking process. In the illustrated example, the docking process includes mobile drive unit 20 raising docking head 110 towards docking surface 350, as indicated by arrow 410. Additionally, in the illustrated example, mobile drive unit 20 and inventory holder 30 are configured so that mobile drive unit 20 lifts inventory holder 30 off the ground when mobile drive unit 20 docks with inventory holder 30 and, as a result, mobile drive unit 20 supports the weight of inventory holder 30 while mobile drive unit 20 is docked to inventory holder 30.

Figure 12:
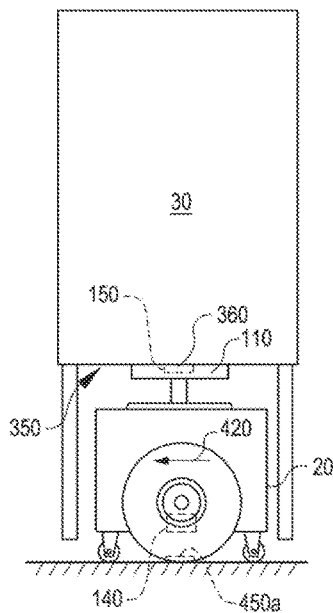

FIG. 12 illustrates operation of mobile drive unit 20 after docking with inventory holder 30. Mobile drive unit 20 is capable of inducing translational and/or rotational movement in inventory holder 30 while mobile drive unit 20 is docked with inventory holder 30. For example, in the illustrated embodiment, inventory holder 30 is supported by mobile drive unit 20 while the two components are docked and mobile drive unit 20 is capable of inducing translational and/or rotational movement in inventory holder 30 by moving or rotating itself or some sub-component of itself, such as docking head 110. As a result, while mobile drive unit 20 and inventory holder 30 are docked mobile drive unit 20 may move inventory holder 30 to a requested destination based on commands received by mobile drive unit 20, as suggested by arrow 420.

Once mobile drive unit 20 and inventory holder 30 arrive at the destination, mobile drive unit 20 may additionally rotate inventory holder 30 to present a particular face of inventory holder 30 to a packer or otherwise maneuver inventory holder 30 to allow access to inventory items 40 stored by inventory holder 30. Mobile drive unit 20 may then undock from inventory holder 30, as described below, or move inventory holder to another destination. For example, mobile drive unit 20 may move inventory holder 30 to a packing station where a packer can select appropriate inventory items 40 from inventory holder 30. Mobile drive unit 20 may then return inventory holder 30 to its original location or another location appropriate for undocking, such as a new storage location reserved for inventory holder 30.

Figure 13:
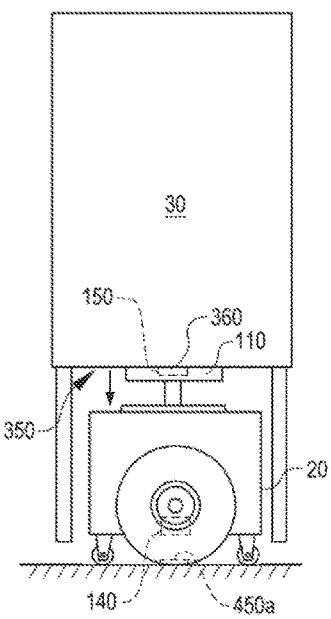

FIG. 13 illustrates mobile drive unit 20 and inventory holder 30 when the two components arrive at an appropriate point for undocking. As noted above, this may represent a final destination specified by the original command, the original storage location for inventory holder 30, or any other point within the workspace. At or near the destination, mobile drive unit 20 may detect another fiducial mark 450, fiducial mark 450B, associated with the undocking location. Mobile drive unit 20 determines its location based on fiducial mark 450B and, as a result, determines that it has reached the undocking location. After determining that it has reached the undocking location, mobile drive unit 20 initiates an appropriate undocking process based on the configuration and characteristics of mobile drive unit 20 and inventory holder 30.

Figure 14:
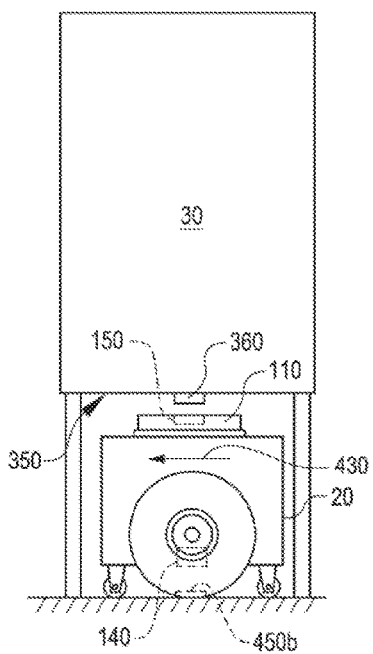

FIG. 14 illustrates a mobile drive unit 20 and inventory holder 30 subsequent to undocking. Mobile drive unit 20 may then move away, as suggested by arrow 430, from inventory holder 30 and begin responding to other commands received by mobile drive unit 20.

As described above, embodiments herein are directed to bladders 34 that can be utilized in storage locations 32 of inventory holders 30. Although an example of one such arrangement is shown and described with respect to FIGS. 1-3, other options and related features are possible.

Figure 15:
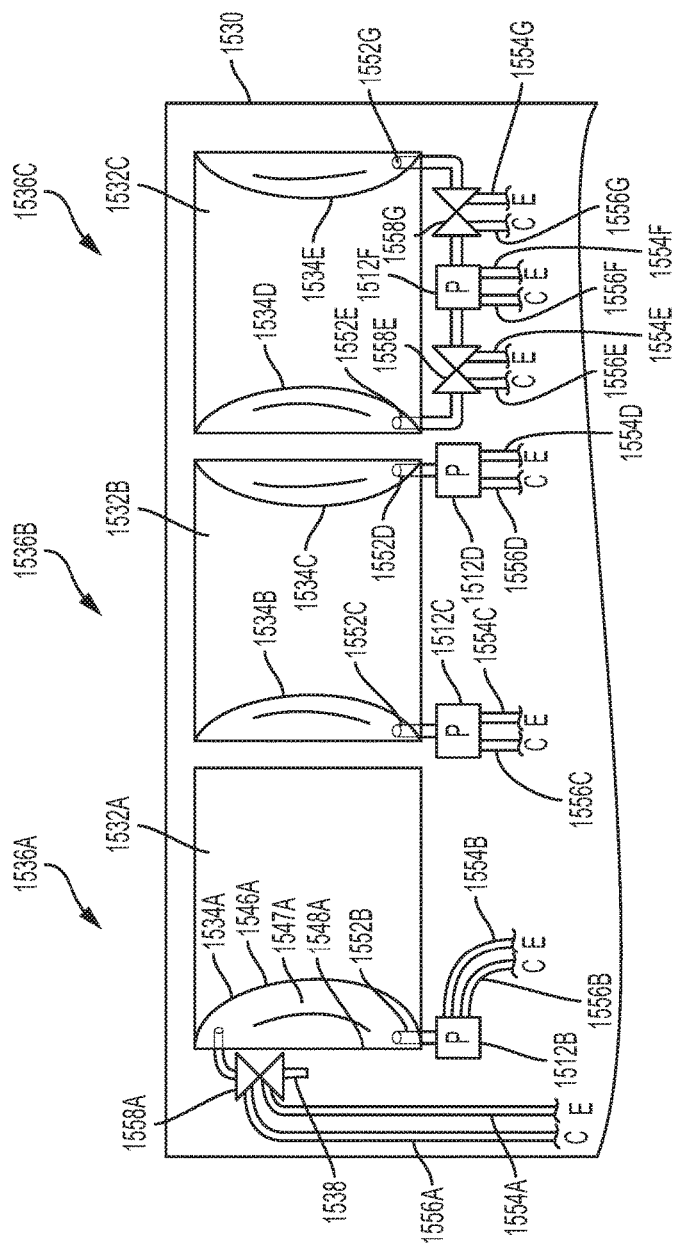
FIG. 15 illustrates examples of inflation networks that utilize designated pressure sources for bladders of individual storage locations according to certain embodiments.
Figure 16:
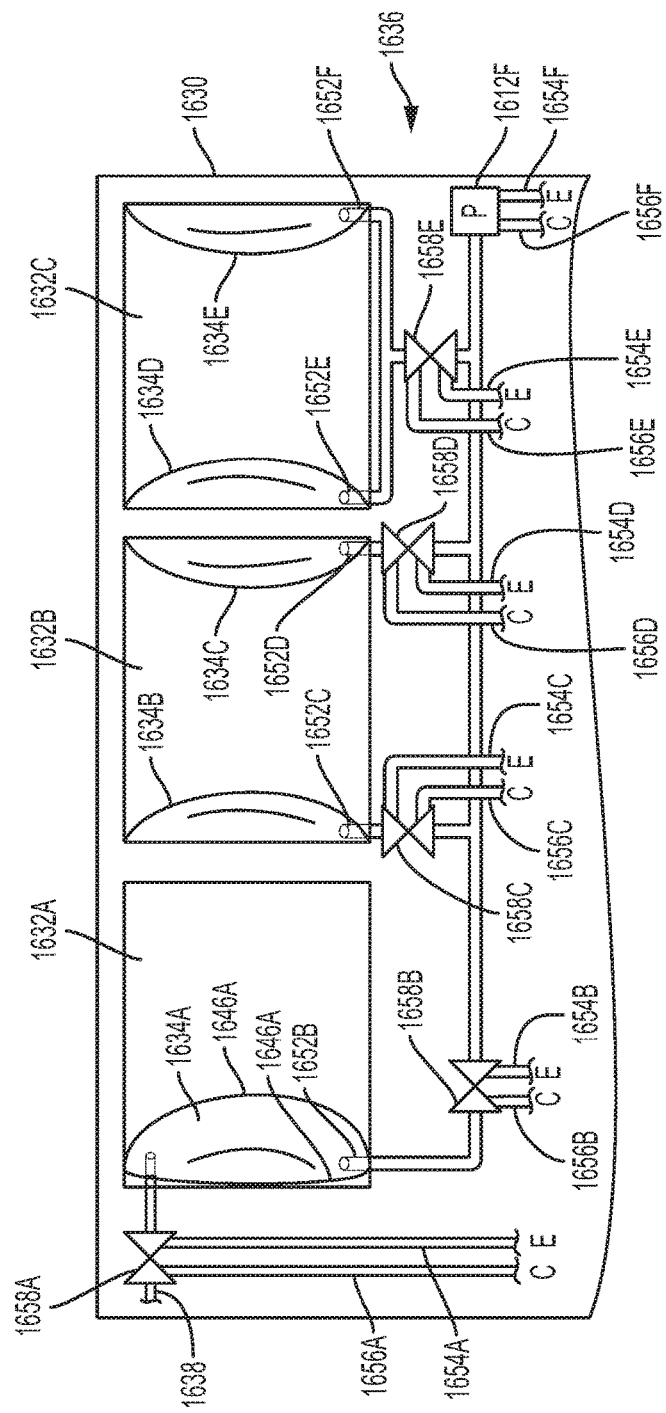
FIG. 16 illustrates an example of an inflation network having a pressure source for bladders of multiple storage locations according to certain embodiments.

For example, any form of inflation network 36 can be utilized. FIGS. 15-20 illustrate some examples of relevant components and arrangements that may be used individually or in combination for the inflation network 36. Generally, similar components are identified with similar pairs of reference numbers and differentiated from one another by a capital letter suffix (e.g., A, B, C) and a prefix corresponding to the figure number. Thus, by way of example, various valves 58 are shown in FIG. 15 and FIG. 16, although they are individually labeled as valves 1558A, 1558E, and 1558G, in FIGS. 15 and 1658A, 1658B, 1658C, 1658D, and 1658E in FIG. 16. Broadly speaking, the inflation networks 36 in FIGS. 15-20 are shown in association with suitable combinations of pressure sources 12, electrical energy sources 14, control communications sources 16, storage locations 32, bladders 34, pressure conduits 52, electrical energy conduits 54, control communications conduits 56, and valves 58.

The bladders 34 can include any suitable combination of materials that permit the bladder 34 to change shape based on fluid transfer with the inflation network 36. For example, the bladder 1534A in FIG. 15 is shown with a rigid material 1546A and a flexible material 1548A coupled together to enclose an internal volume 1547A of the bladder 1534. The illustrated rigid material 1546A corresponds to a boundary wall of the storage location 1532A in the inventory holder 1530, although other rigid structure could additionally or alternatively used. The flexible material 1548A of the bladder 1534A may be sufficiently flexible to permit the internal volume 1547A to shrink or grow based on changes in an amount of air or other fluid present in the internal volume 1547A. In another example shown in FIG. 16, the bladder 1634A is a separate element instead of being integrally formed into a boundary wall of the storage location 1632A in the inventory holder 1630. In some embodiments, such as shown in FIG. 16, the bladder 1634A is formed entirely of flexible material 1646A.

The pressure sources 12 may correspond to any suitable combination of pumps, compressors, or other mechanisms capable of providing air or another fluid at a suitable pressure for movement toward or away from the bladders 34. The valves 58 may correspond to any switching and/or throttling structure that can control whether and/or how much fluid is communicated from the pressure source 12 through a respective path of the inflation network 36. The pressure conduits 52 can include any hoses, tubing, or other suitable structure for transferring fluid among and/or between bladders 34, pressure sources 12, and/or valves 58. The control communications sources 16 may correspond to a microcontroller, some element of the management module 15, or some other apparatus capable of sending signals for communicating with the pressure sources 12 and/or valves 58 to control inflation of the bladders 34. The control communications conduit 56 may correspond to any wiring, cabling, wireless communication connection, or other element that can provide a suitable communication link between the control communications source 16 and the pressure sources 12 and/or valves 58. The electrical energy sources 14 can correspond to a battery, portable generator, power utility grid connection, or any other element that may provide electrical energy or power for operating elements such as the valves 58, pressure sources 12, and/or the control communications sources 16. The electrical energy conduits 54 may correspond to any wiring, cabling, wireless power connection, or other element for transferring electrical energy or power from the electrical energy source 14 to elements such as the valves 58, pressure sources 12, and/or the control communications sources 16.

Figure 17:
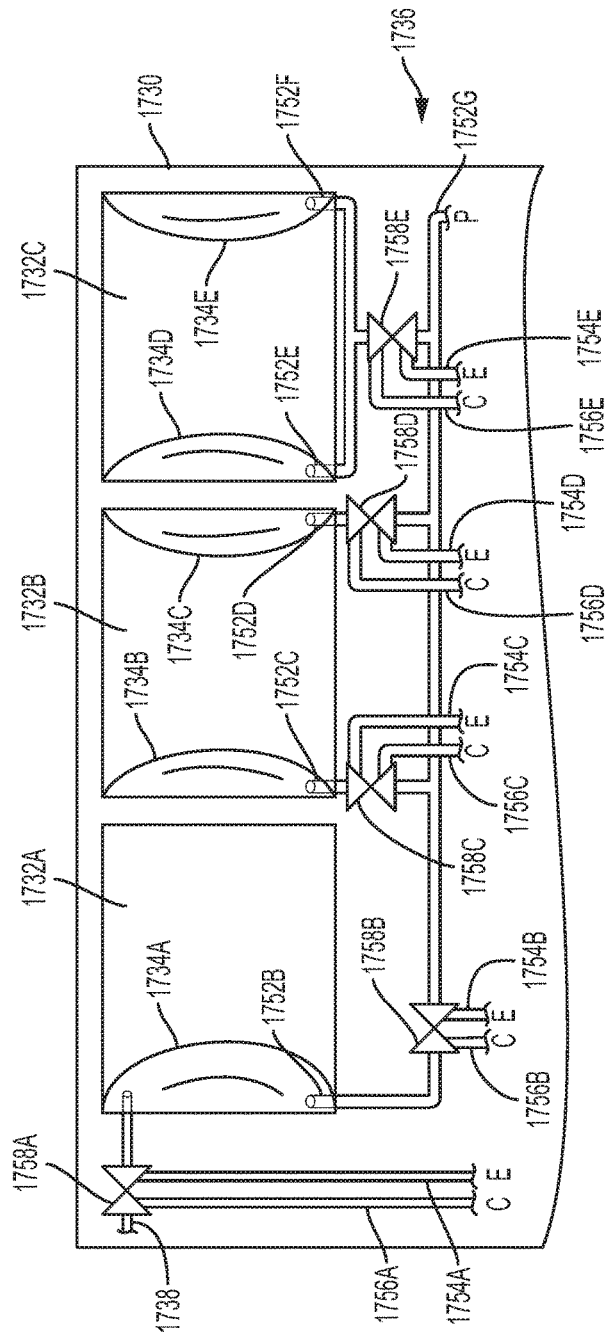
FIG. 17 illustrates an example of an inflation network with pressure conduits for transferring pressure from a remote pressure source to bladders of storage locations according to certain embodiments.

Although each pressure source 12 and valve 58 in FIGS. 15-17 is shown with a respective electrical energy conduit 54 and control communications conduit 56, other arrangements are possible. In some embodiments, an electrical energy conduit 54 may be combined with a control communications conduit 56, such as to provide electrical power and control signals through a single cable to a pressure source 12 or valve 58.

Any number of inflation networks 36 or associated components may be utilized individually or in combination. For example, in FIG. 15, each storage location 1532A, 1532B, and 1532C is associated with a different respective inflation network 1536A, 1536B, and 1536C and different pressure sources 1512B, 1512C, 1512D, and 1512F. Each of the valves 1558 and pressure sources 1512 of these respective inflation networks 1536 are shown with respective control communications conduits 1556 and electrical energy conduits 1554, which may be respectively coupled to shared or distinct control communication sources 16 and/or energy sources 14 (such as those described in greater detail below with respect to FIGS. 18-20).

Controlled deflation of bladders 34 may be achieved in any suitable manner. In one example, such as shown by the inflation network 1536A at left in FIG. 15, the bladder 1534A may include an exhaust conduit 1538. A valve 1558A (e.g., a one-way valve) may be coupled with the exhaust conduit 1538 and controlled to determine whether and/or how much air is permitted to leave the bladder 1534A. In another example, such as also shown by the inflation network 1536A at left in FIG. 15, the pressure source 1512B may be reversible in order to draw air or other fluid out through the same pressure conduit 1552B that is used to supply fluid from the pressure source 12 into the bladder 1534A. Although both options are shown in the inflation network 1536A in FIG. 15, the exhaust conduit 1538 and the reversible pressure source 12 may be used with or without the presence of the other.

Any number of bladders 34 may be used in a respective storage location 32, including one (e.g., in FIG. 15, the single bladder 1534A in the storage location 1532A at left), two (e.g., in FIG. 15, the two bladders 1534B and 1534C of the second storage location 1532B), three, or more than three.

Any number of bladders 34 may be supplied by a particular pressure source 12. For example, in the inflation network 1536A at left in FIG. 15, the pressure source 1512B is arranged to supply the single bladder 1534A. In this example, the pressure source 1512B may be controlled directly (e.g., without any valve 58) to control inflation of the associated bladder 1534A. As another example, in the inflation network 1536B at center in FIG. 15, each bladder 1534B and 1534C is supplied by a respective pressure source 1512C and 1512D. In a further example, in the inflation network 1536C at right in FIG. 15, the pressure source 1512F supplies all of the bladders 1534D and 1534E of the storage location 1532C.

Particularly in inflation networks 36 having a pressure source 12 that supplies more than one bladder 34, valves 58 may be used to control the inflation level of different bladders 34. For example, in the inflation network 1536C at right in FIG. 15, the valves 1558E and 1558G may be operated to respectively control amounts of fluid that travel from the pressure source 1512F to the respective bladders 1534D and 1534E. In another example shown in FIG. 16, a single pressure source 1612F may provide a supply of pressurized fluid that is distributed among various bladders 1634A, 1634B, 1634C, 1634D, and 1634E based on operation of the valves 1658A, 1658B, 1658C, 1658D, and 1658E. Moreover, a valve 58 may be used to control inflation of any number of bladders 34. In one example, different valves 1658C and 1658D are used to control inflation of different bladders 1634B and 1634C. In another example, a single valve 1658E can be used to control inflation of multiple bladders 1634D and 1634E.

Any arrangement of pressure sources 12 can be utilized. For example, in FIG. 15, each storage location 1532 has at least one pressure source 1512 designated specifically for that storage location 1532. As another example, in FIG. 15, in the inflation network 1536B shown at center, each bladder 1534B and 1534C has an individual pressure source 1512C and 1512D. In a further example, in FIG. 16, an entire row of storage locations 1632 on an inventory holder 1630 has a pressure source 1612 designated for that row. In yet another example, in FIG. 17, a group of storage locations 1732 on an inventory holder 1730 may be supplied through a pressure conduit 1752G to a pressure source 12 (not shown) that is remote from the storage locations 1732.

Figure 18:
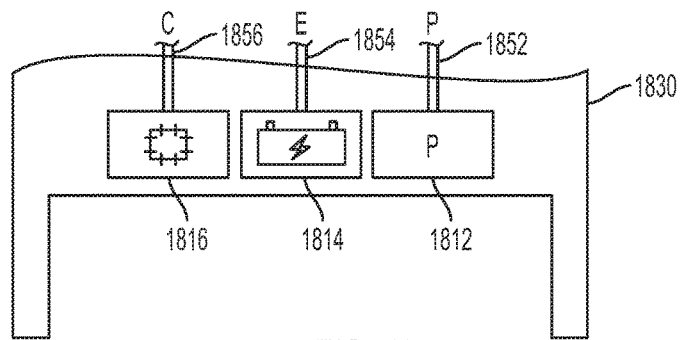
FIG. 18 illustrates an example of a portion of an inventory holder that may include suitable sources for supplying an inflation network according to certain embodiments.

FIG. 18 illustrates an example of a portion of an inventory holder 1830 that may include suitable sources for supplying an inflation network 36. The inventory holder 1830 may include any suitable combination of a pressure sources 1812, an electrical energy source 1814, and/or a control communications source 1816. For example, any one of these elements may provide an appropriate supply via respective pressure conduits 1852, electrical energy conduits 1854, and/or control communications conduits 1856 to corresponding structures of inflation networks 36, such as those in FIGS. 15-17.

Figure 19:
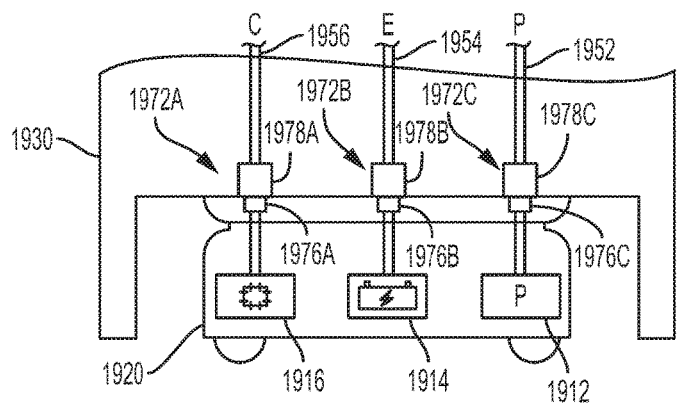
FIG. 19 illustrates an example of a portion of a mobile drive unit that may include suitable sources for supplying an inflation network according to certain embodiments.

FIG. 19 illustrates an example of a portion of a mobile drive unit 1920 that may include suitable sources for supplying an inflation network 36. Suitable couplers 1972 arranged among the inventory holder 1930 and the mobile drive unit 1920 may engage one another. More specifically, a control communication coupler 1976A may engage a corresponding mating control communication coupler 1978A on the inventory holder 1930. An electrical energy coupler 1976B may engage a corresponding mating electrical energy coupler 1978B on the inventory holder 1930. A pressure coupler 1976C may engage a corresponding mating pressure coupler 1978C on the inventory holder 1930. Engagement of these corresponding couplers 1972 may permit a pressure source 1912, an electrical energy source 1914, and/or a control communications source 1916 of the mobile drive unit 1920 to communicate suitable supply into respective pressure conduits 1952, electrical energy conduits 1954, and/or control communications conduits 1956 of the inventory holder 1930 for transfer to inflation networks 36 of the inventory holder 1930, such as to corresponding structures of inflation networks 36 of FIGS. 15-17.

Figure 20:
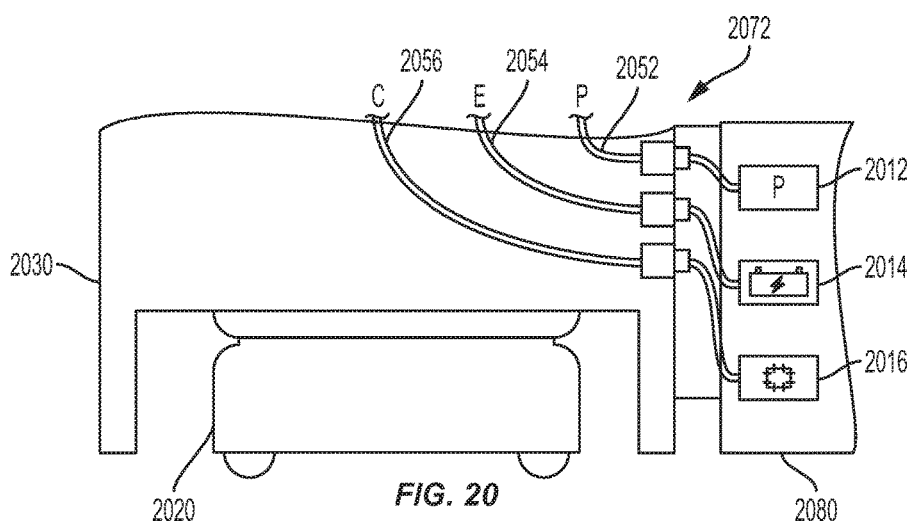
FIG. 20 illustrates an example of another structure that may include suitable sources for supplying an inflation network according to certain embodiments.

FIG. 20 illustrates an example of another structure 2080 that may include suitable sources for supplying an inflation network 36. The structure 2080 may correspond to a structure that is distinct from the inventory holder 2030 and distinct from the mobile drive unit 2020, such as a structure that might be located at a station 50 of the inventory system 10. Suitable couplers 2072 arranged among the inventory holder 2030 and the structure 2080 may engage one another and permit a pressure source 2012, an electrical energy source 2014, and/or a control communications source 2016 of the structure 2080 to communicate suitable supply into respective pressure conduits 2052, electrical energy conduits 2054, and/or control communications conduits 2056 of the inventory holder 2030 for transfer to inflation networks 36 of the inventory holder 2030, such as to corresponding structures of inflation networks 36 of FIGS. 15-17.

Figures 21, 22, 23:
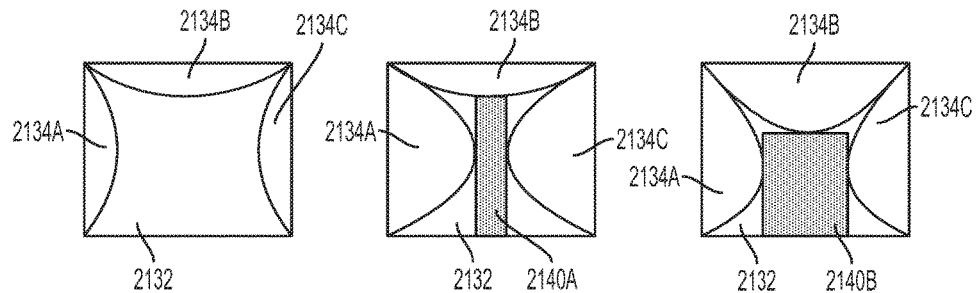
FIGS. 21-23 illustrate an example of bladders inflating relative to items of different sizes.

FIGS. 21-23 illustrate an example of bladders 2134 inflating relative to items 2140A and 2140B of different sizes. FIG. 21 shows the bladders 2134 in an uninflated state. The bladders 2134 collectively are shown corresponding to an inverted U-shape. Although the bladders 2134 are shown as distinct bladders 2134 in FIGS. 21-23, in some embodiments, the bladders 2134 may correspond to sections or segments of a single U-shaped bladder. Additionally or alternatively, the bladders 2134 may individually or collectively correspond to any other shape.

In response to inflation, the bladders 2134 may expand and occupy volume of the storage location 2132 until contacting an inventory item 2140. For example, as shown in FIG. 22, relative to a tall, skinny item 2140A, the top bladder 2134B may expand a short distance, while the lateral bladders 2134A and 2134C expand a larger distance. Indeed, additional expansion of the top bladder 2134B may be blocked by the space occupied by the expansion of the lateral bladders 2134A and 2134C. In contrast, with respect to a shorter, wider item 2140B in FIG. 23, the top bladder 2134B may expand from the uninflated state of FIG. 21 by an increased amount in comparison to the amount of expansion in FIG. 22, while the lateral bladders 2134A and 2134C expand a shorter distance than with the taller, skinnier item 2140A of FIG. 22. Additional expansion of the lateral bladders 2134A and 2134C may be blocked by the space occupied by the expansion of the top bladder 2134B. In various embodiments, the bladders 2134 in a storage location 2132 may continue to expand until the volume of the storage location 2132 is substantially occupied by the bladders 2134 and any items 2140 located in the storage location 2132, e.g., such that any space remaining in the storage location 2132 apart from the bladders 2134 and the items 2140 is negligible. In various embodiments, such expansion may be useful in determining how much space is occupied by the items 2140.

Figure 24:
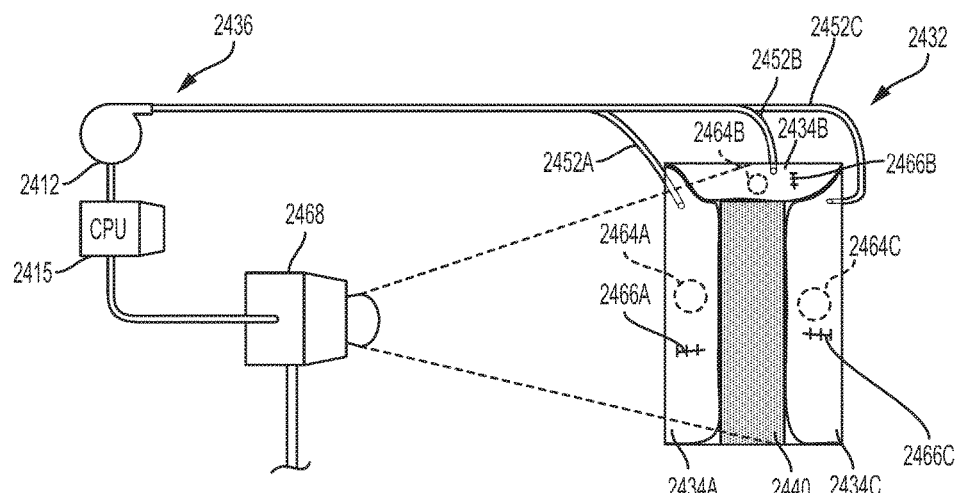
FIG. 24 illustrates elements of an inventory system that may be used with bladders to determine space utilization in a storage location.

FIG. 24 illustrates elements that may be used with bladders 2434 to determine space utilization in a storage location 2432. In various embodiments, information about an inflation level of the bladders 2434 can be used to determine an amount of occupied space in the storage location 2432 that is occupied by objects other than the bladders 2434. The amount of occupied space, for example, may be indicative of a volume of an inventory item 2440 in the storage location 2432. Thus, in some embodiments, the amount of occupied space may be used (e.g., by the management module 15) to update a record about an inventory item 2440, such as to update a volume or other size parameter associated with the item 2440. In some embodiments, the amount of occupied space may be used to determine an amount of available space in which additional inventory items 2440 may be received within the storage location 2432. Accordingly, the management module 15 may instruct that an additional item 2440 be stored in the storage location 2432 (e.g., if a record for the additional item 2440 indicates that it can fit within the amount of available space in the storage location 2432) and/or instruct that an additional item 2440 be stored elsewhere from the storage location 2432 (e.g., if a record for the additional item 2440 indicates that it cannot fit within the amount of available space in the storage location 2432).

Information about the inflation level of the bladders 2434 can be gathered in a variety of ways. In one example that may be appreciated with reference to FIG. 24, a computer system 2415 (e.g., which may correspond to some component of the management module 15) may be in communication with a pressure source 2412 and capable of determining an amount of fluid transferred from the pressure source 2412 to the bladders 2434 corresponding to a particular storage location 2432. The amount of fluid transferred may be determined, for example, based at least in part on an amount of time that a pump, valve, or other element of the inflation network 2436 was operated. Other parameters that may additionally or alternatively be relevant for such a determination may include an intensity level at which an element was operated (e.g., a flow rate or percent capacity), and/or a pressure level detected in the inflation network 2436 (e.g., such as by a pressure sensor).

In another example that may be appreciated with reference to FIG. 24, the information about the inflation level of the bladders 2434 may be based at least in part upon information about a visual characteristic of the storage location 2432 that is variable according to the inflation level of the bladders 2434. In some embodiments, light sensors 2464 may be positioned to detect an amount of light that is passing through the inflated bladders 2434. The amount of light detected by the light sensors 2464 may vary according to the inflation level of the bladders 2434 and thus be used to determine the inflation level of the bladders 2434. In some embodiments, a camera or other optical sensor 2468 may be utilized to detect light reflected by the bladders 2434. For example, the bladders 2434 may include some material or coating that emits a particular color, wavelength of light, or other visual profile that is detectable by the optical sensor 2468 and distinguishable from a visible profile of items 2440 located in the storage location. This information may be used to determine a ratio of the front face of the storage location that is covered by the bladders 2434 or some other relevant measurement to indicate a level of inflation of the bladders 2434.

In another example that may be appreciated with reference to FIG. 24, the information about the inflation level of the bladders 2434 may be based at least in part upon information from sensors 2466 that provide information about an amount that the surfaces of the bladders 2434 have stretched. For example, the sensors 2466 may include strain gauges or other sensors that can provide an output that varies according to a surface tension applied to a surface bearing the sensor. The amount that the bladders 2434 have stretched may be indicative of an inflation level of the bladders 2434 and facilitate determination of the amount of occupied space and/or available space in the storage location 2432.

Figures 25, 26, 27:
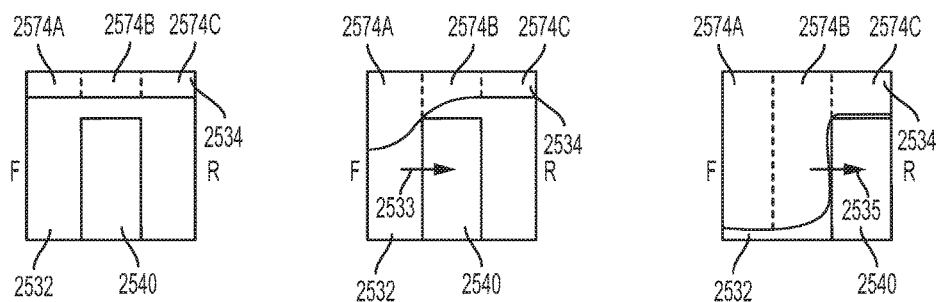
FIGS. 25-27 illustrate an example of a bladder with differing sections that determine an expansion profile of the bladder.

FIGS. 25-27 illustrate an example of a bladder 2534 with differing sections 2574 that determine an expansion profile of the bladder 2534 within a storage location 2532. The bladder 2534 is shown with a front section 2574A, a middle section 2574B, and a rear section 2574C. The front section 2574A is more flexible than the middle section 2574B, and the middle section 2574B is more flexible than the rear section 2574C. Thus, upon inflation of the bladder 2534, as shown with reference to FIG. 26 in comparison to FIG. 25, the front section 2574A stretches sooner and further than the middle section 2574B, and the middle section 2574B stretches sooner and further than the rear section 2574C. This may cause the front section 2574A to contact an item 2540 in the storage location 2532 before the other sections 2574B and 2574C do so and urge the item 2540 away from the front section 2574A, e.g., in the direction of the arrow 2533 and toward a rear R of the storage location 2532. Continued inflation of the bladder 2534 may cause the sections 2574 to expand further in turn and cause additional movement of the item 2540 as illustrated by arrow 2535 in FIG. 27, e.g., such that the item 2540 is moved further away from the front F of the storage location 2532. Although the bladder 2534 is shown in FIGS. 25-27 with three different sections 2574 that in operation move items 2540 away from the front of the storage location 2532, in other embodiments, the bladder 2534 may include any number of sections 2574 (including one, two, three, or more than three) arranged to move stored items 2574 in any desired direction relative to the storage location 2532.

Figure 29:
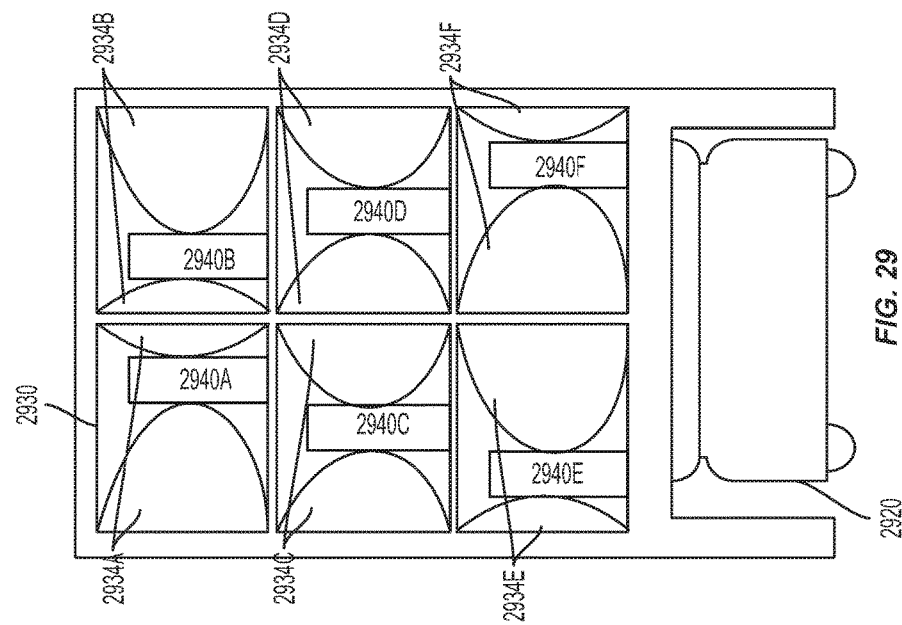
FIGS. 28-29 illustrate an example of use of bladders to move inventory items relative to an inventory holder to adjust a weight distribution in the inventory holder according to certain embodiments.
Figure 28:
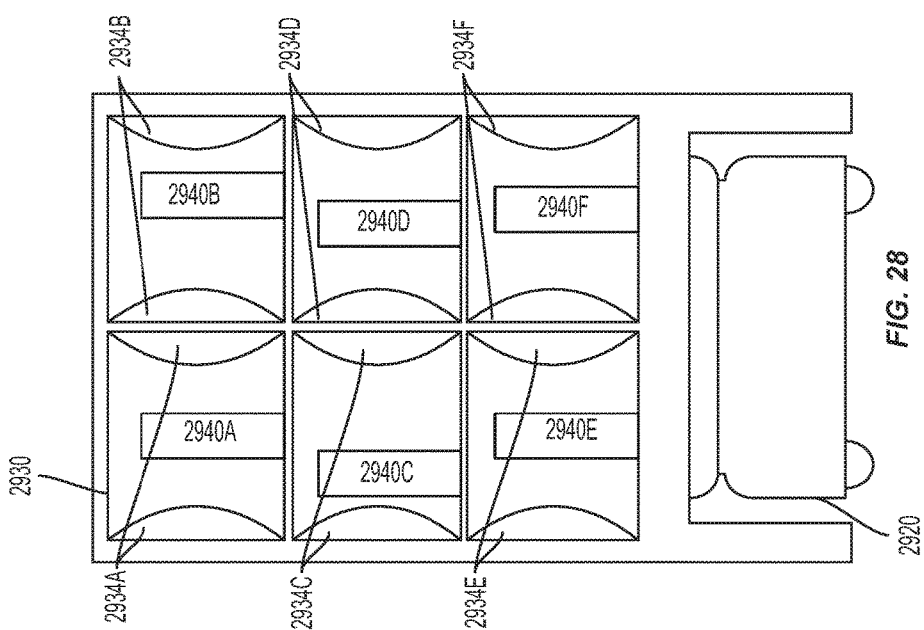

FIGS. 28-29 illustrate an example of use of bladders 2934 to move inventory items 2940 relative to an inventory holder 2930 to adjust a weight distribution in the inventory holder 2930. In the embodiment shown in FIGS. 28-29, inflation of the bladders 2934 is controlled to cause inventory items 2940A and 2940B near the top of the inventory holder 2930 to be moved toward a center of the inventory holder 2930 and inventory items 2940E and 2940F near the bottom of the inventory holder 2930 to be moved away from the center of the inventory holder 2930. Such an arrangement may improve a stability of the inventory holder 2930 when being moved by a mobile drive unit 2920. The bladders 2934 may additionally or alternatively be used to move inventory items 2940 in other manners. For example, in some embodiments, the bladders 2934 may be utilized to move items 2940 so as to shift a weight distribution or a center of mass of the inventory holder 2930 in a manner that allows the mobile drive unit 2920 to have improved traction or other navigability characteristics during movement carrying the inventory holder 2930.

Figure 30:
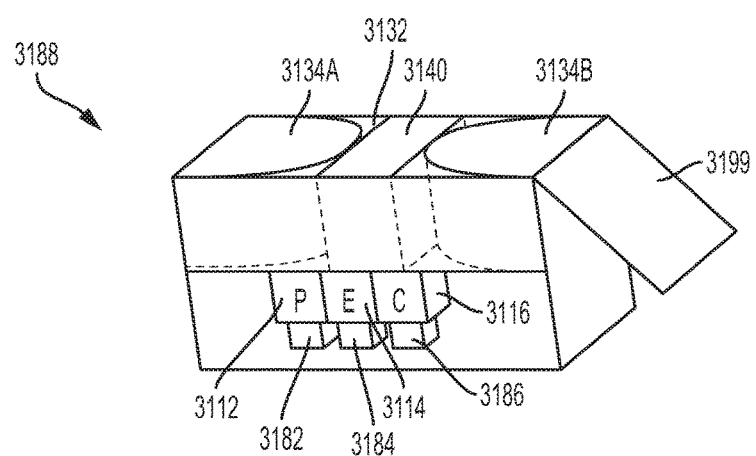
FIG. 30 illustrates a container that may include bladders and other suitable elements for operation of the bladders according to certain embodiments.

In some embodiments, the bladders 34 described herein may be utilized apart from inventory holders 30. For example, FIG. 30 illustrates a container 3188 having a storage location 3132 and associated bladders 3134. Although the container 3188 is shown in FIG. 30 with a single storage location 3132 and a pair of bladders 3134, any other number of storage locations 3132 and/or associated bladders 3134 may be provided alternatively or additionally. The container 3188 may include other suitable elements for operation of the bladders 3188. For example, the container 3188 may include a self-contained pressure source 3112, electrical energy source 3114, and/or control communications source 3116. Additionally or alternatively, any of these elements may be supplemented with or replaced with a corresponding pressure interface 3182, electrical energy interface 3184, and/or control communications interface 3186, which may facilitate connection with a pressure source 3112, electrical energy source 3114, and/or control communications source 3116 separate from the container for operating systems of the container 3116. In an illustrative example, the container 3188 may receive an item 3140 and the bladders 3134 may be inflated around the item 3140 based on suitable supply of pressure, electrical energy, and control communications received via the pressure interface 3182, electrical energy interface 3184, and control communications interface 3186. The container 3188 may be disconnected at these interfaces, the lid 3199 may be closed, and the container 3188 transported to another location. At the new location, the lid 3199 may be removed, and the container 3188 may be connected via the pressure interface 3182, the electrical energy interface 3184, and the control communications interface 3186 to a different pressure source 3112, electrical energy source 3114, and control communications source 3116 to cause the bladders 3134 to deflate and permit the item 3140 to be removed from the container 3188. Hence, bladders 3134 may be incorporated into the container 3188 with a suitable combination of other elements to provide many similar functions to those described with respect to the inventory holder 30, including but not limited to, moving an item 3140 relative to the container 3188, compressing items 3140 to increase an amount of items that can be stored in the container 3188, visually identifying a place in the container 3188 from among other options, securing an item 3140 relative to the container 3188, providing selective access to the item 3140 in the container 3188, and/or estimating an amount of space in the container 3188 that is occupied by the item 3140 or available for other items 3140.

Figure 31:
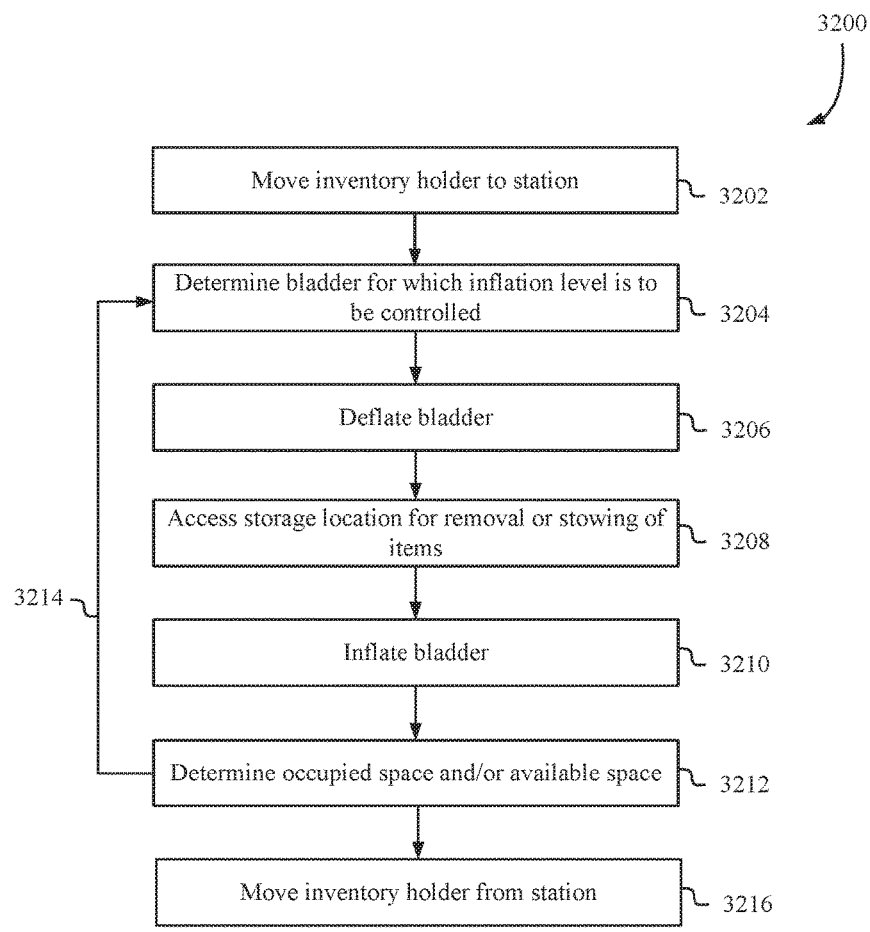
FIG. 31 is a flow chart representing a process for using bladders and associated other elements according to certain embodiments.

FIG. 31 is a flow chart representing an example process 3200 for using bladders 34 and associated other elements with some embodiments. Some or all of the process 3200 (or any other processes described herein, or variations and/or combinations thereof) may be performed under the control of one or more computer systems configured with executable instructions, such as the management module 15 or other modules described herein, and may be implemented as code (e.g., executable instructions, one or more computer programs or one or more applications) executing collectively on one or more processors, by hardware or combinations thereof. The code may be stored on a computer-readable storage medium, for example, in the form of a computer program including a plurality of instructions executable by one or more processors. The computer-readable storage medium may be non-transitory. Moreover, unless indicated otherwise, acts shown in the processes are not necessary performed in the order shown, and/or some acts can be omitted in embodiments.

The process 3200 includes at 3202 moving an inventory holder 30 to a station 50. For example, the management module 15 may provide a task assignment 18 to a mobile drive unit 20 to move the inventory holder 30. The inventory holder 30 may be moved to the station 50 based on a determination that the inventory holder 30 includes available space for inventory items 40 that are to be stowed at the station 50, a determination that the inventory holder 30 includes an item 40 that is to be picked at the station 50 for fulfilling an inventory order, a determination that the inventory holder 30 includes inventory items 40 that are to be counted at the station 50, and/or other determinations that the inventory holder 30 satisfies any other criteria for an operation to be performed at the station 50.

At 3204, the process 3200 includes determining a bladder 34 for which an inflation level is to be controlled. For example, the management module 15 may determine that an inflation level of a certain bladder 34 is to be controlled based on that certain bladder 34 being associated with a storage location 32 that is the target of an operation to be performed. In one illustrative example, the management module 15 may identify a particular bladder 34 based on the particular bladder 34 being located in a storage location 32 that is identified as including an item 40 that is to be retrieved for fulfilling an inventory order. In additional illustrative examples, the bladder 34 may correspond to a storage location 32 that contains an item 40 that is to be moved, compressed, secured, and/or measured by altering an inflation level of the bladder 34, and/or a storage location 32 for which access is to be facilitated or limited by altering inflation level of the bladder 34.

At 3206, the process 3200 includes deflating the bladder 34. For example, the management module 15 may control an inflation network 36 to cause deflation of the bladder 34. The bladder 34 deflated at 3206 may be the bladder 34 determined at operation 3204. Deflation of the bladder 34 at operation 3206 may cause the bladder 34 to contract or otherwise occupy a reduced amount of space in the storage location 32. Such deflation may permit access to the storage location 32 that may have been inhibited or prevented prior to the deflation.

At 3208, the process 3200 includes accessing the storage location 32 for removal and/or stowing of items 40. For example, the management module 15 may provide instructions to a human or robotic operator to remove or add a particular item 40 with respect to the storage location 32. In some embodiments, the deflation provided at 3206 (and/or the inflation provided that 3210, discussed below) can provide a visual indicator for an operator 108 to indicate a storage location 32 that is designated for the removal or addition of a particular item 40.

At 3210, the process 3200 includes inflating the bladder 34. For example, the management module 15 may control an inflation network 36 to cause inflation of the bladder 34. The bladder 34 inflated at 3210 may be the bladder 34 determined at operation 3204. Inflation of the bladder 34 at operation 3210 may cause the bladder 34 to expand or otherwise occupy an increased amount of space in the storage location 32. Such expansion may cause the bladder 34 to engage an item 40 located in the storage location 32. In some embodiments, inflating the bladder 34 at 3210 may cause an item 40 in the storage location 32 to be moved, compressed, and/or secured relative to the storage location 32. In some embodiments inflating the bladder 34 at 3210 may prevent or inhibit access to the storage location 32 that may have been permitted or facilitated prior to the inflation.

At 3212, the process 3200 includes determining occupied space and/or available space in the storage location 32. For example, the management module 15 may obtain information from other elements of the inventory system 10 to facilitate such a determination (e.g. as shown and described with respect to FIG. 24). In some embodiments, the amount of occupied and/or available space may be determined before and/or after an item 40 is accessed at 3208. For example, an amount of space detected before access may be compared with an amount of space after access to determine a change in space resulting from the accessing operation. Such information may be used for verification purposes. For example, if the determined change in space resulting from the accessing operation does not sufficiently match a size of an item 40 that was to be removed in the accessing operation, the management module 15 may provide an alert or other indication that an incorrect item 40 may have been removed or added to the storage location 32 during the accessing operation.

At 3214, parts of the process 3200 may be iterated. For example, upon determining an amount of available space in the storage location 32 at 3212, the management module 15 may determine that an additional item 40 may be added to the storage location 32 (such as for improved space utilization efficiency) and determine (as at 3204) that the particular bladder 34 that was just inflated at 3210 should be deflated again (as at 3206) to permit access for the additional item 40 to be added to the storage location 32 (as at 3208). In another example, operations of deflating and inflating bladders 34 (e.g., as at 3206 and 3210, respectively), may be iterated in order to move inventory items 40 to obtain a favorable weight distribution within an inventory holder 40 (such as described with respect to FIGS. 29-30). Such modification of the weight distribution may occur at a station 50 (for example, to obtain a favorable weight distribution for a freshly loaded inventory holder 30 prior to moving inventory holder 30 away from the station 50 with the mobile drive unit 20) and/or apart from the station 50 (for example, to obtain a favorable weight distribution when a mobile drive unit 20 engages the inventory holder 30 in a storage area for carrying the inventory holder 30 to the station 50). In a further illustrative example, operations of deflating and inflating bladders 34 (e.g., as at 3206 and 3210, respectively), may be iterated in order to provide a visually identifiable indication for an operator 108 to recognize a particular storage location 32 that is the target of a particular operation.

At 3216, the process 3200 includes moving the inventory holder 30 away from the station 50. For example, the management module 15 may provide a task assignment 18 to a mobile drive unit 20 to move the inventory holder 30 away from the station 50, such as to a storage area and/or to another station 50 for subsequent operations relative to the inventory holder 30. In various embodiments, the inflation levels of the bladders 34 on inventory holder 30 may be maintained when the inventory holder 30 is moved away at 3216 (or otherwise moved, such as at 3202), for example, so that items 40 stored in inventory holder 30 are secured and not readily accessible until the bladder 34 is deflated (as at 3206) at a later time for facilitating access to storage location 32 (as at 3208).

Figure 32:
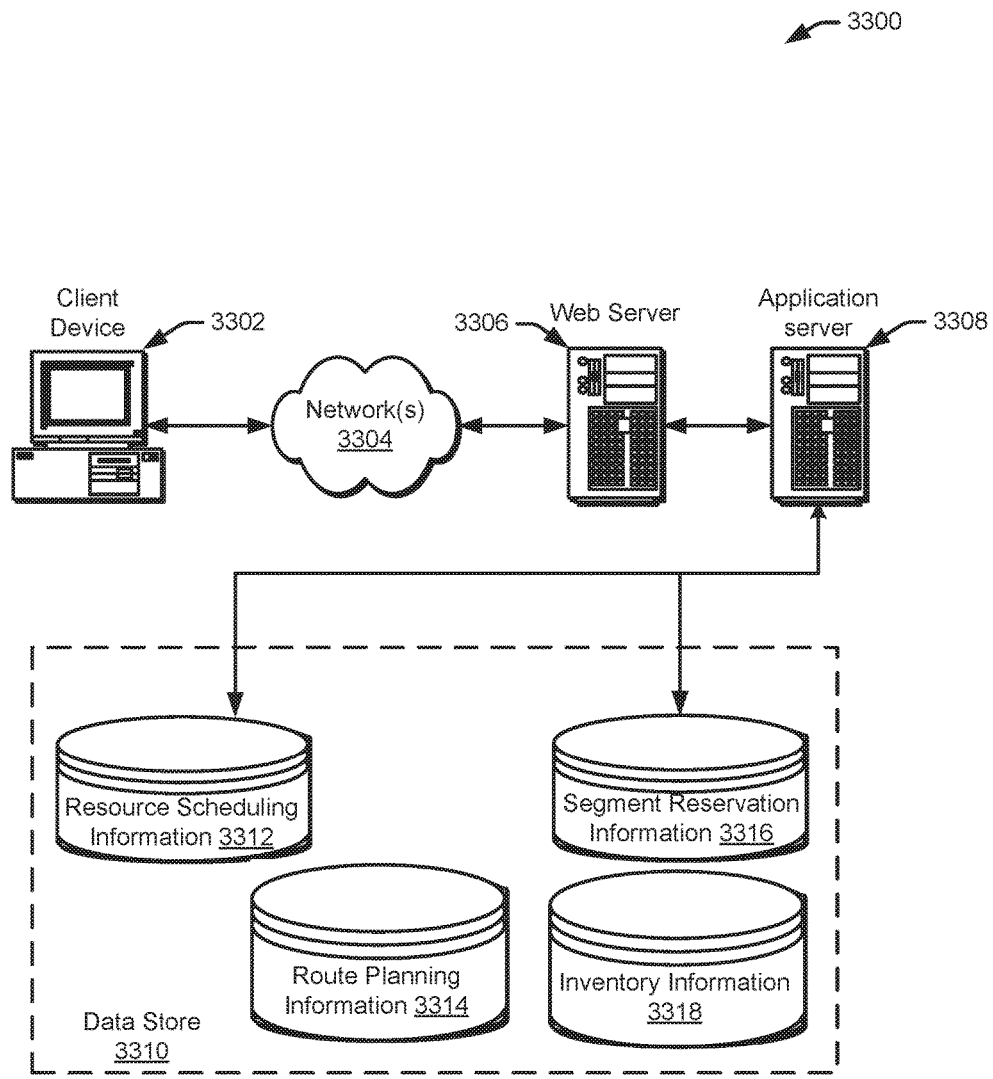
FIG. 32 illustrates an environment in which various features of the inventory system can be implemented, in accordance with at least one embodiment.

FIG. 32 illustrates aspects of an example environment 3300 for implementing aspects in accordance with various embodiments. As will be appreciated, although a Web-based environment is used for purposes of explanation, different environments may be used, as appropriate, to implement various embodiments. The environment includes an electronic client device 3302, which can include any appropriate device operable to send and receive requests, messages, or information over an appropriate network 3304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 3306 for receiving requests and serving content in response thereto, although for other networks an alternative device serving a similar purpose could be used as would be apparent to one of ordinary skill in the art.

The illustrative environment includes at least one application server 3308 and a data store 3310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 3302 and the application server 3308, can be handled by the Web server. It should be understood that the Web and application servers are not required and are merely example components, as structured code discussed herein can be executed on any appropriate device or host machine as discussed elsewhere herein.

The data store 3310 can include several separate data tables, databases or other data storage mechanisms and media for storing data relating to a particular aspect. For example, the data store illustrated includes mechanisms for storing information which can be used by modules described herein, such as resource scheduling information 3312, route planning information 3314, segment reservation information 3316, and/or inventory information 3318. It should be understood that there can be many other aspects that may need to be stored in the data store, such as for page image information and to access right information, which can be stored in any of the above listed mechanisms as appropriate or in additional mechanisms in the data store 3310. The data store 3310 is operable, through logic associated therewith, to receive instructions from the application server 3308 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environtent in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 32. Thus, the depiction of the system 3300 in FIG. 32 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®' and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:
1. A system, comprising:
a plurality of storage locations each having a respective volume;
a plurality of bladders, at least a portion of the plurality of storage locations being associated with at least one respective bladder of the plurality of bladders; and
a sensor associated with the at least one respective bladder of the plurality of bladders, the sensor configured to output sensor data representing an inflation level of the at least one respective bladder, the sensor comprising at least one of a light sensor positioned on an exterior surface of the at least one respective bladder, a strain gauge positioned on the exterior surface of the at least one respective bladder, or an optical sensor oriented towards the portion of the plurality of storage locations and the at least one respective bladder;

wherein each bladder is selectively inflatable and deflatable to change an amount of the volume of a respective storage location that is occupied by the at least one respective bladder, and is configured for fluid communication with an inflation network operable to change an amount of pressurized fluid present in the at least one respective bladder, based at least in part on the sensor data, so as to selectively change the amount of the volume of the respective storage location occupied by the at least one respective bladder.

2. The system of claim 1, wherein each bladder of the plurality of bladders, when in fluid communication with the inflation network, is selectively inflatable and deflatable by at least one of:

controlling a pressure source in fluid communication with the at least one respective bladder to control an amount of pressurized fluid communicated at least one of into the bladder or out of the at least one respective bladder;

controlling a valve to regulate an amount of pressurized fluid communicated between the pressure source and the at least one respective bladder; or controlling a valve arranged to release pressurized fluid from the at least one respective bladder.

3. The system of claim 1, wherein at least a portion of the inflation network is configured for releasable coupling with another portion of the inflation network to transfer at least one of pressurized fluid, electrical energy, or control signals.

4. The system of claim 1, wherein the plurality of storage locations and the plurality of bladders are comprised in an inventory holder configured to be moved by a mobile drive unit within a facility.

5. The system of claim 4, wherein at least a portion of the inflation network is configured to releasably couple with the mobile drive unit to transfer at least one of pressurized fluid, electrical energy, or control signals.

6. The system of claim 4, wherein at least a portion of the inflation network is configured to releasably couple with a structure in the facility that is distinct from the mobile drive unit and distinct from the inventory holder to transfer at least one of pressurized fluid, electrical energy, or control signals.

7. The system of claim 1, wherein each bladder of the plurality of bladders, when in fluid communication with the inflation network, is selectively inflatable and deflatable with respect to the respective storage location associated with the at least one respective bladder to at least one of:

limit access to the respective storage location for at least one of stowing an inventory item in the respective storage location or removing an inventory item from the respective storage location;

facilitate access to the respective storage location for at least one of stowing an inventory item in the respective storage location or removing an inventory item from the respective storage location;

limit movement of an item relative to the respective storage location;

cause movement of an item relative to the respective storage location;

visually identify the respective storage location of the plurality of storage locations;

compress an item in the respective storage location; or facilitate a determination of an amount of the volume of the respective storage location that is occupied by objects other than the at least one respective bladder.

8. The system of claim 1, wherein each bladder is further selectively inflatable to press against an inventory item located in the respective storage location.

9. A system, comprising:

a plurality of storage locations each having a respective volume; and a plurality of bladders, at least a portion of the plurality of storage locations being associated with at least one respective bladder of the plurality of bladders, the at least one respective bladder comprising a first flexible section and a second flexible section, wherein the first flexible section is more flexible than the second flexible section, and wherein inflation of the at least one respective bladder causes the first flexible section to expand before the second flexible section expands;

wherein each bladder is selectively inflatable and deflatable to change an amount of the volume of a respective storage location that is occupied by the at least one respective bladder, and is configured for fluid communication with an inflation network operable to change an amount of pressurized fluid present in the at least one respective bladder so as to selectively change the amount of the volume of the respective storage location occupied by the at least one respective bladder.

10. The system of claim 1, wherein the sensor is the light sensor and the sensor data from the light sensor represents the inflation level of the at least one respective bladder by at least measuring an amount of light that passes through the at least one respective bladder.

11. The system of claim 1, wherein the sensor is the strain gauge and the sensor data from the strain gauge represents the inflation level of the at least one respective bladder by at least measuring a surface tension applied to the exterior surface.

12. The system of claim 1, wherein the sensor is the optical sensor and the sensor data from the optical sensor represents the inflation level of the at least one respective bladder by at least detecting light reflected by a portion of the at least one respective bladder that is oriented towards the optical sensor.

* * * * *